E. W. BLISS.
Improvement in Soldering-Machines.
No. 130,693. Patented Aug. 20, 1872.
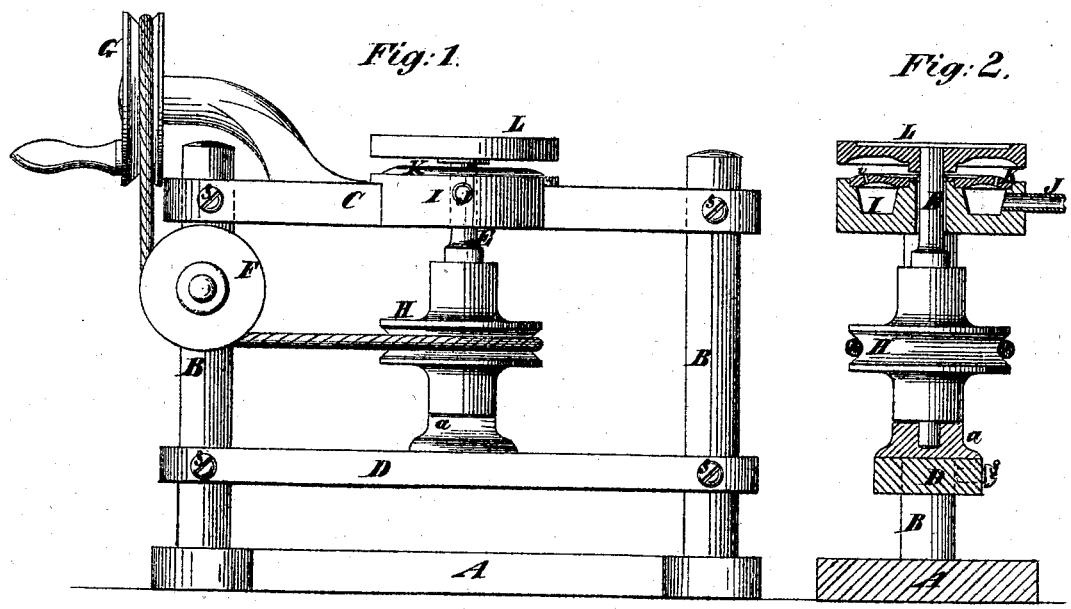

UNITED STATES PATENT OFFICE.

ELIPHALET W. BLISS, OF BROOKLYN, NEW YORK.

IMPROVEMENT IN SOLDERING-MACHINES.

Specification forming part of Letters Patent No. 130,693, dated August 20, 1872.

Specification of an Improvement in Soldering-Machines, invented by ELIPHALET W. BLISS, of Brooklyn, in the county of Kings and State of New York.

This invention relates to soldering machines for soldering in the heads and bottoms of cylindrical or other circular cans, vessels, or boxes. It consists, first, in the combination, with an annular chamber of the gas-burner, of a removable or changeable perforated annular plate. It also consists in certain provisions for adapting the machine to soldering of cans, boxes, or vessels of different sizes.

In the accompanying drawing, Figure 1 is a side view of a machine constructed according to my invention. Fig. 2 is a transverse section of the same, and Fig. 3 is a plan of the burner.

Similar letters of reference indicate corresponding parts in all the figures.

The frame of the machine consists of a bed-plate, A, two upright fixed posts or standards, B B, arranged thereon, and a head-plate, C, forming the burner-head, and a step-plate, D. These latter two are capable of vertical adjustment on the posts B B to suit cans, boxes, or vessels of different height, and are secured in place by set-screws, s s. E is a shaft or spindle, which is supported in a step-bearing, a, on the step-plate D, and in a bearing in the burner-head C. It is provided with a pulley, H, and is driven by a belt, W, passing round the latter and round pulleys F F and G, to the latter of which motion is imparted in any suitable manner. This pulley G may, however, be dispensed with, and motion be obtained for the driving-belt W from any suitable driving-shaft. In the central portion of the burner-head C, surrounding the spindle E concentrically, there is formed an annular box, I, which forms the lower portion of the burner, and with which communicates a gas-pipe, J. A removable top-plate, K, of corresponding shape, fitting into a circular rabbet formed around the top of this box, forms the top of the burner, and is perforated, as shown at i i, to permit the escape of gas in a circle of jets concentric with the spindle E. This cap closes the box and prevents any gas escaping round the spindle E, whose upper bearing is formed within the inner periphery of the annular box I. Several of these top-plates may be provided, having their circles of jet-holes of different diameters, according to the size of the can, box, or vessel to be soldered. L is the soldering bed or table, secured to the upper end of the spindle E by being fitted thereto with a key or feather and groove, thereby providing for its ready removal and the substitution of one of larger or smaller size, to suit larger or smaller cans, boxes, or vessels. In its upper side there is a circular recess of suitable size for the reception of the can, and its under side is made concave annularly over the perforations i i in the top-plate K of the burner.

Before setting the machine in operation, the burner-head C and step-plate are adjusted to a suitable height, according to the height of the can, box, or vessel to be soldered, to enable the operator to manipulate conveniently; and a solder-bed, L, of suitable size is applied to the spindle, and a top-plate, K, having a circle of jet-holes of suitable diameter, is applied to the burner, according to the diameter of the can, box, or vessel to be soldered. The jets issuing from the burner are then lighted and rotary motion is imparted to the soldering-bed spindle. The top or bottom is then placed on the body of the can, which is then placed with the top or bottom downward in the recess in the soldering-bed L, and a piece of solder with resin or other material for flux are then placed in the can. As soon as the solder is melted it will, by the centrifugal force generated by the revolution of the bed, be thrown out against the sides of the can and made to fill the joint. It may, however, in some cases be desirable to insert a pointed piece of wire into the can and hold its point against the junction of the body and end of the can, and thereby insure or expedite the filling of their joints. In those cans having a hole in the top-plate covered by a mouth-piece, both their tops and bottoms may be soldered on in the machine, the top being first affixed and the bottom after—the solder for the latter being introduced through the hole in the top. The burner-box I may have an air-pipe communicating with it, as well as a gas-pipe, to provide for mixing air with the gas before the ignition of the latter; or the pipe J may have two branches, one for air and the other for gas.

Claim.

1. The combination, with the annular box I of the gas-burner, of the removable or changeable annular perforated top-plate K, substantially as and for the purpose herein set forth.

2. The combination of the adjustable step-plate D, the adjustable burner-head I, the rotating spindle E, and soldering-bed L, and the fixed frame A B B, the whole arranged for operation, substantially as described, for the purpose set forth.

E. W. BLISS.

Witnesses:
  A. G. WUST,
  FRED. HAYNES.